United States Patent [19]

Bertenshaw et al.

[11] Patent Number: 5,066,896
[45] Date of Patent: Nov. 19, 1991

[54] ELECTRIC LIGHTING AND POWER CONTROLLERS THEREFOR

[75] Inventors: David R. Bertenshaw, Lightwater; Richard Williamson, Twickenham, both of United Kingdom; John Wright, Sunbury, Great Britain

[73] Assignee: Strand Lighting Limited, Isleworth, United Kingdom

[21] Appl. No.: 450,294

[22] Filed: Dec. 12, 1989

[30] Foreign Application Priority Data

Dec. 20, 1988 [GB] United Kingdom ............... 8829717

[51] Int. Cl.[5] ............................................. H05B 39/08
[52] U.S. Cl. .................................... 315/291; 315/292; 315/294; 315/307; 315/194
[58] Field of Search ............... 315/291, 307, 294, 194, 315/311, 292, 293

[56] References Cited

U.S. PATENT DOCUMENTS

| 4,004,214 | 6/1977 | Evans . | |
|---|---|---|---|
| 4,241,295 | 12/1980 | Williams, Jr. | 315/294 |
| 4,359,670 | 11/1982 | Hosaka et al. | 315/307 |
| 4,380,730 | 4/1983 | Morton . | |
| 4,661,765 | 4/1987 | Bando et al. . | |
| 4,689,548 | 8/1987 | Mechlenburg . | |
| 4,804,916 | 2/1989 | Frank | 323/300 |
| 4,839,566 | 1/1989 | Herold et al. . | |

FOREIGN PATENT DOCUMENTS

| 0237733 | 1/1987 | European Pat. Off. . |
| 3316761 | 7/1983 | Fed. Rep. of Germany . |
| 2115240 | 9/1983 | United Kingdom . |
| 2150323A | 6/1985 | United Kingdom . |

OTHER PUBLICATIONS

New Approach to the Constant Current Control by A. Microprocessor—IECI '79 Proceedings, Mar. 19/21, 1979.

Primary Examiner—Eugene R. LaRoche
Assistant Examiner—Son Dinh
Attorney, Agent, or Firm—James E. Brunton

[57] ABSTRACT

In a lighting power controller having a controllable switch (such as a thyristor), in order to compensate for perturbations in the mains supply waveform, the waveform is analyzed and a table is set up of thyristor firing angle against output RMS voltage. To obtain a desired output RMS voltage, the thyristor is fired at the angle indicated by the table.

9 Claims, 7 Drawing Sheets

ELECTRIC LIGHTING AND POWER CONTROLLERS THEREFOR

This invention relates to electrical power controllers which are for use in an AC circuit to control a lighting load and which particularly, but not exclusively employ a controllable switch which is operated so as to conduct during parts of half cycles of the AC supply. The invention is more particularly, but not exclusively, concerned with lighting circuits including luminaires for stage, or television or film studio, lighting.

A tungsten filament electric lamp functions essentially as a black body radiator, and accordingly the spectral characteristics of the lamp are dependent upon the temperature of the filament and thus upon the applied RMS voltage. Especially in a color television studio, great attention is paid by the camera operator to the color balance of the camera to achieve faithful reproduction, especially of skin tones. This color balance is altered by variations in the lighting color temperature. Such variations can be caused, amongst other things, by variation in the voltage of the mains supply. In a perfect system, the mains voltage waveform is a perfect sine wave, having a peak amplitude equal to the square-root-of-two times the rated RMS voltage. However, in practice, the amplitude may be less due to voltage drops in the supply cable, and the sine wave form may be distorted in two main ways. Firstly, the peaks of the wave may be suppressed due to saturation of transformers used in the supply network. Secondly, at a site where many thyristor or triac dimmer controlled loads are in use, the form of each half wave may be reduced in a final portion of the half wave due to the increased load on the supply compared with the initial portion of the half wave.

The present invention is concerned with compensating for perturbations in the mains supply, and in accordance with one aspect of the invention the mains voltage is measured during a half-wave cycle, the firing point for a thyristor or triac which would provide a desired output RMS voltage is determined, and the thyristor or triac is fired accordingly.

Preferably, the invention is performed by forming a table of measured voltage against time, processing the data of the table to form another table of RMS output voltage against firing point, and then inverting the latter table to provide a look-up table of firing point against RMS output voltage.

There follows a description by way of example of a specific embodiment of the invention and modifications thereto, with reference to the accompanying drawings in which.

Figure 1:
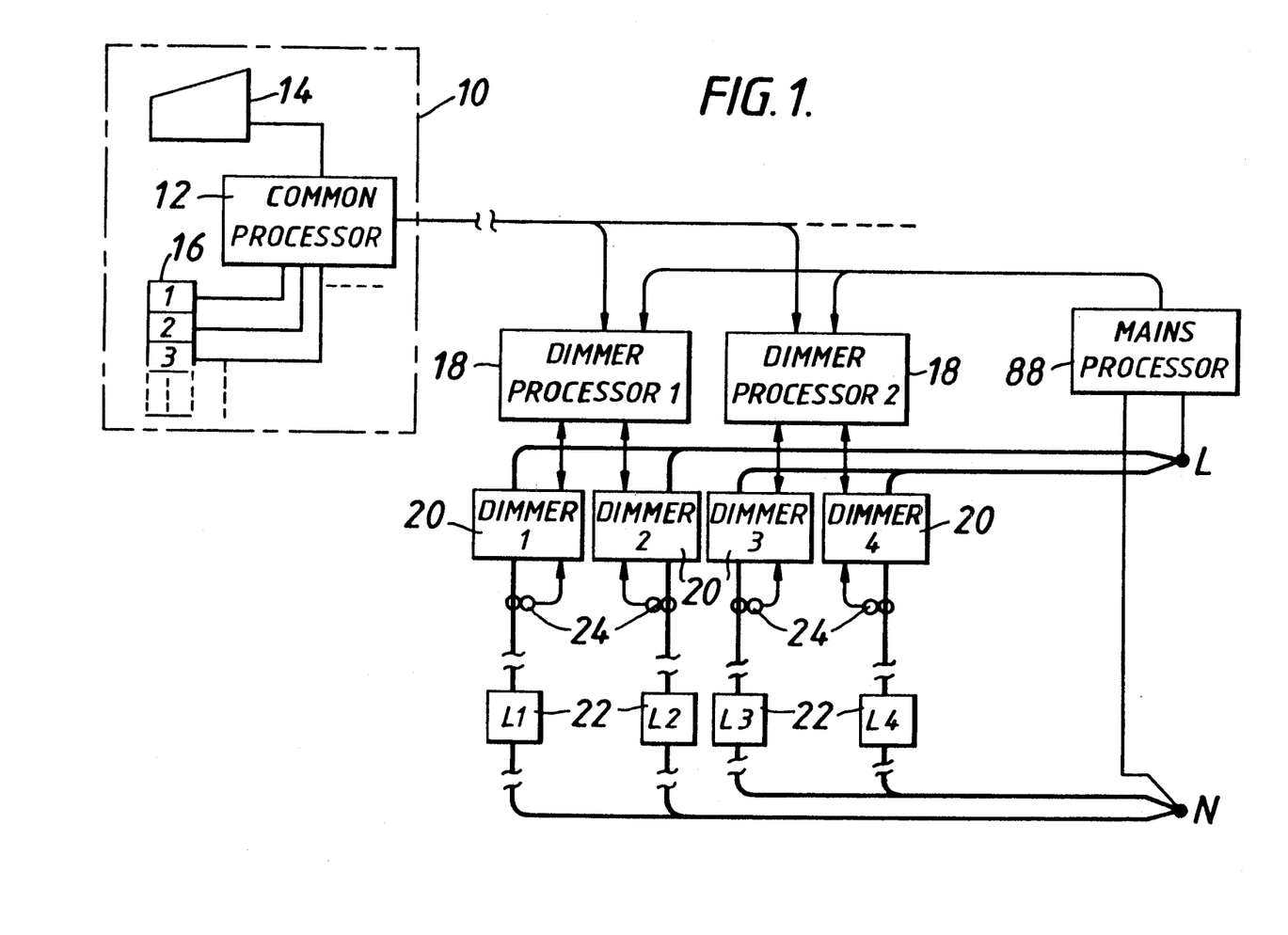
FIG. 1 is a block diagram of a lighting system.

Referring to FIG. 1, a lighting control system is shown which includes a lighting control desk 10 having a common processor unit 12, a data input terminal 14 and a bank of faders 16 for respective dimmers. The common processor unit 12 sends data to one or more dimmer processors 18, two of which are shown for simplicity. Each dimmer processor controls one or more dimmers 20, two of which are shown for each dimmer processor 18. Each dimmer 20 is connected in series with a load 22 across a mains supply L-N and is associated with a respective current sensor 24.

Figure 2:
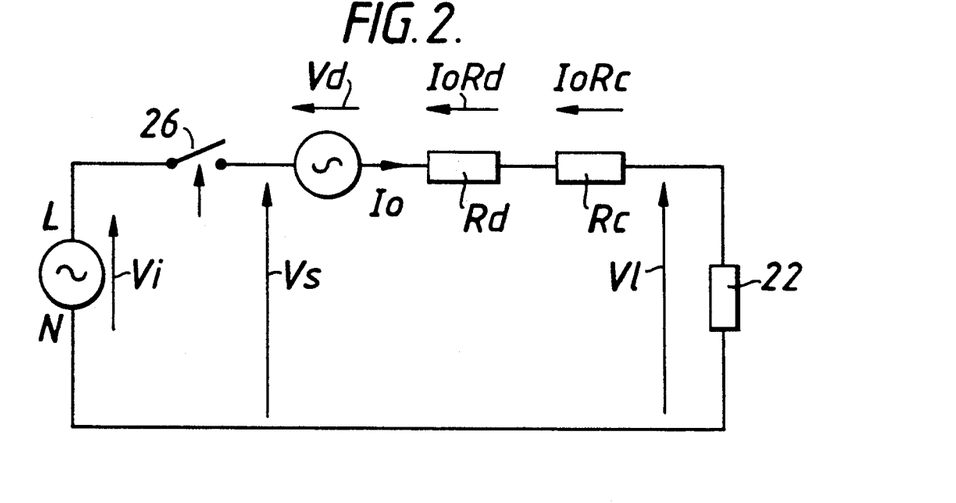
FIG. 2 is an equivalent power circuit for each dimmer channel; p

Referring to FIG. 2, an equivalent power circuit is shown for each dimmer channel. An RMS voltage Vi is supplied by the mains L-N to a controllable switch, such as a thyristor 26, which is closed part-way through each mains half-cycle and opens at the end of the cycle, producing a switched output RMS voltage Vs. A current-independent RMS voltage drop Vd arises across the thyristor 26. The thyristor 26 and associated dimmer components such as a filtering inductor also act as resistor, represented by Rd, across which there is an RMS voltage drop IoRd, where Io is the RMS output current. The connecting cable of the circuit also acts as a resistor, represented by Rc, across which there is an RMS voltage drop IoRc. It will therefore be appreciated that the RMS voltage Vl across the load 22 will be:

$$Vl = Vs - Vd - Io(Rd + Rc)$$

and that Vs will be a function of the supply voltage and the conduction period in each half cycle of the switch 26.

Figure 3:
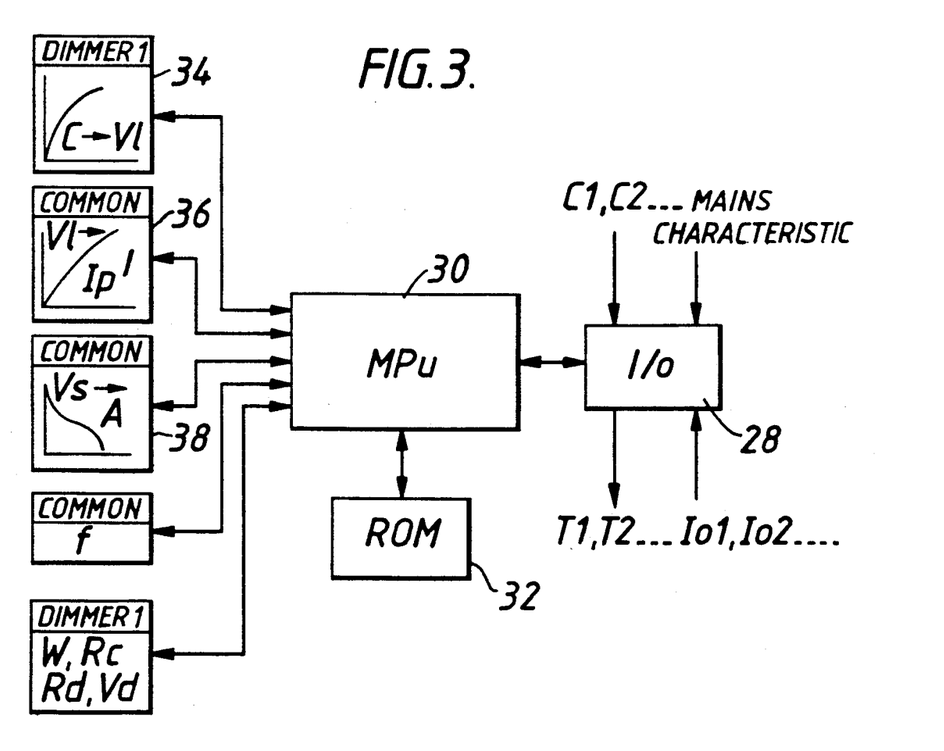
FIG. 3 is a block diagram of one of the dimmer processors of FIG. 1.

Referring to FIG. 3, there is shown a block diagram of one of the dimmer processors 18. The processor includes an input/output port 28, which receives digital signals C1, C2, representing the settings of the desired levels for the respective dimmer channels 1 and 2. The signals C for all of the dimmer channels may be transmitted from the processor of the control desk as time-division-multiplexed signals, or as signals associated with addresses of the respective channels, all on a single line. Alternatively, the control signals C may be transmitted as digital or analog signals on separate lines. The input port also receives output current signals Io1, Io2 from the respective dimmers 20, and supplies timing signals T1, T2 to the respective dimmers.

The dimmer processor 18 also includes a microprocessor 30, a program ROM 32, and a RAM which stores various tables and variable values. For each dimmer channel there is a look-up table 34 which relates RMS load voltage Vl to control value C (only one table 34 is shown for simplicity). In common for all dimmer channels controlled by the respective dimmer processor, there are (a) a look-up table 36 which relates predicted RMS current Ip' to the RMS load voltage Vl for a tungsten filament load of predetermined rating, for example 1 kW; and (b) a look-up table 38 which relates thyristor conduction angle A to the switched output RMS voltage Vs. In common for all of the dimmer channels, the RAM stores a value f of the mains frequency, and for each dimmer channel it stores the resistance values Rd, Rc and thyristor static voltage drop value Vd, mentioned above, and also a value W of the power of the respective load 22.

Figure 4A:
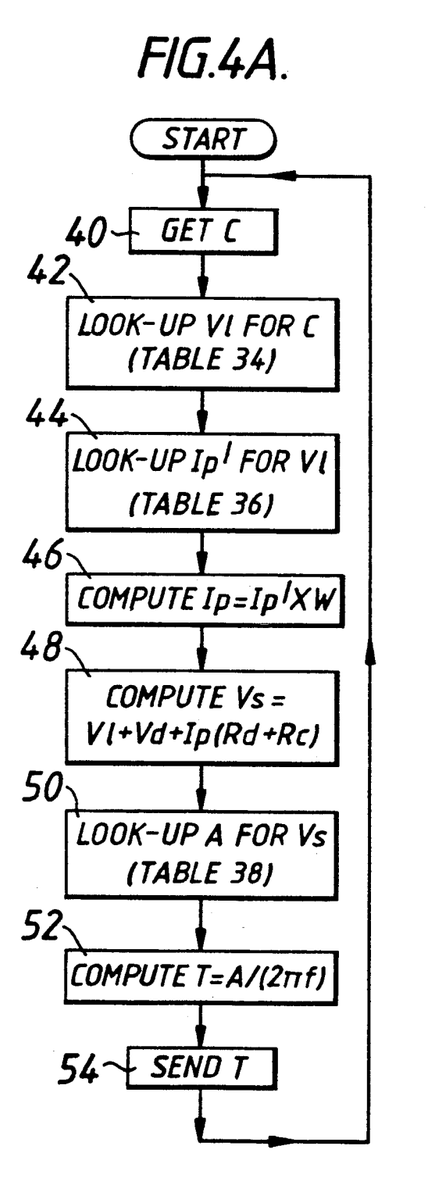
FIGS. 4A and 4B are flow charts of the processes carried out by the dimmer processor of FIG. 3.
Figure 4B:
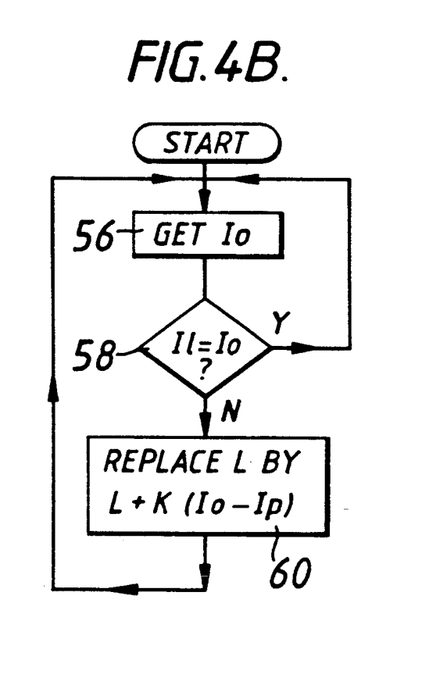

For each dimmer channel, the dimmer processor 18 performs two processes as shown in FIGS. 4A and 4B.

FIG. 4A shows a feed-forward loop for receiving the control signal C and outputting the timing value T. In step 40, the value of C is taken from the I/O port 28. In step 42, the table 34 is used to look-up the RMS load voltage Vl to be supplied for the value C. In step 44, the table 36 is used to look-up an RMS current Ip' which it is predicted would flow if the load were a 1kW tungsten filament lamp. In step 46, the value Ip' is scaled by the factor W which is the currently stored value of the power of the load (in kW) to obtain the predicted current Ip to the load. In step 48, the required switched output RMS voltage Vs is calculated using the equation mentioned above with reference to FIG. 2 and the stored values of Rd, Rc and Vd. In step 50, the table 38 is used to look-up the firing angle A which is required to provide the calculated switched voltage Vs. In step 52, the firing timing T after the start of a half-wave cycle is calculated from the equation $T = A/(2.pi.f)$ using the stored value of f. In step 54, the calculated value T is sent via the I/O port 28 to the respective dimmer 20. The process is then repeated.

FIG. 4B shows a feed-back process performed by the dimmer processor 18. In step 56, the value Io of the measured output current is taken from the I/O port 28. It is then determined in step 58 whether the measured current Io is equal to the predicted current Ip utilized in the process of FIG. 4A. If so, the process of FIG. 4B loops back to the beginning. However, if there is an inequality, in step 60 the stored load value W is incremented by an amount proportional to the difference between measured load current Io and the predicted load current Ip. The process then loops back to the beginning.

Figure 5:
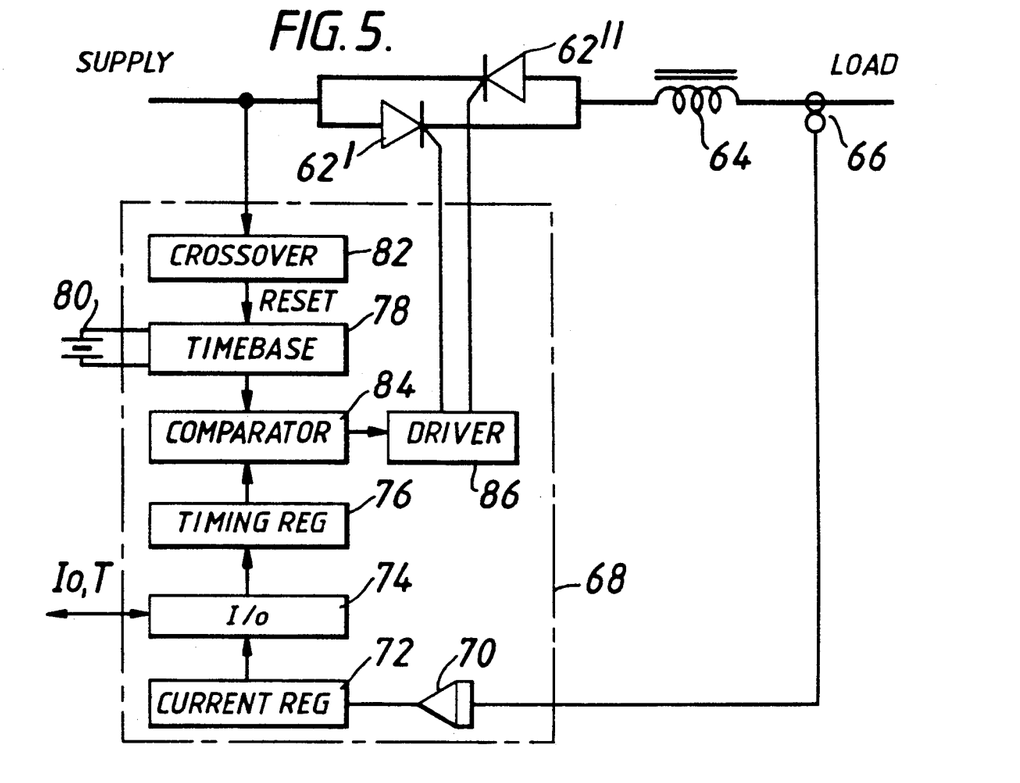
FIG. 5 is a block diagram of one of the dimmer units of FIG. 1.

Reference is now made to FIG. 5 which illustrates one of the dimmers 20. A pair of thyristors 62', 62" are connected oppositely in parallel in the power line from the mains supply to the load. An inductor 64 is included for filtering, and a current sensor 66, for example in the form of a multi-turn coil of wire, is placed on the load side of the thyristors and provides a analog signal proportional to the load current. The dimmer also includes a circuit 68 including an analog-to-digital converter 70 to convert the detected current signal to a digital value Io and a register 72 for storing the detected current value. An input/output port 74 is included for outputting the detected current value Io to the dimmer processor 18, and for receiving from the dimmer processor 18 the firing time value T in the form of 10 bit data, which is passed to a timing register 76. The circuit 68 also includes a ten bit timebase 78 controlled by a crystal 80. The timebase 78 is reset by a zero-crossing signal provided by a zero-crossing detector 82 connected to the supply line. Resetting occurs at the beginning of each half-cycle of the mains. The outputs of the timebase 78 and the timing register 76 are compared by a comparator 84, and once the timebase output has increased so as to equal the content of the timing register 76, a signal is provided to a driver circuit 86 which supplies appropriate pulses to the gates of the thyristors 62', 62" so that the appropriate thyristor conducts for the remainder of the half-cycle.

It will be appreciated from the above that for each dimmer channel the respective dimmer processor provides a conversion from the control value C to the firing timing T taking into account the desired dimmer transfer characteristic (Table 34) and the voltage drop in the circuit. The voltage drop is calculated on the basis of a predicted current in order to avoid high errors in compensation due to transmission delays and to processing delays in the event of the control value C being rapidly changed. For example, if the control value C is suddenly increased from a minimum value to a maximum value, a current higher than the steady state current will initially flow through the lighting load, until the steady state temperature and resistance of the lamp filament are reached. If the voltage drops were determined from the measured current, rather than the "predicted" current, then until the high transient current value has been measured, transmitted and processed, undercompensation would be provided for the voltage drop in the circuit. Once the high transient current had been measured and processed, over-compensation would be provided, because by that time the transient would have passed and the steady state reached. By utilizing a "predicted" current determined from the filament characteristic (Table 36) and the stored load, the errors in compensation during transients are reduced, and by adjusting the stored load value (FIG. 4B), steady state compensation is correctly achieved.

Figure 6:
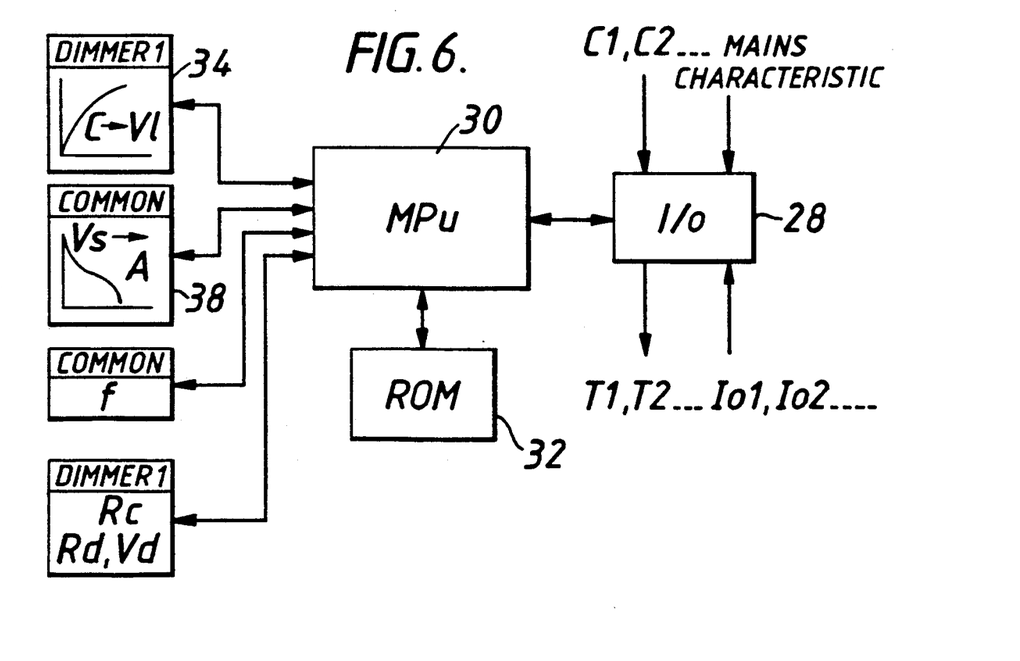
FIG. 6 is a block diagram of a modified dimmer processor.
Figure 7:
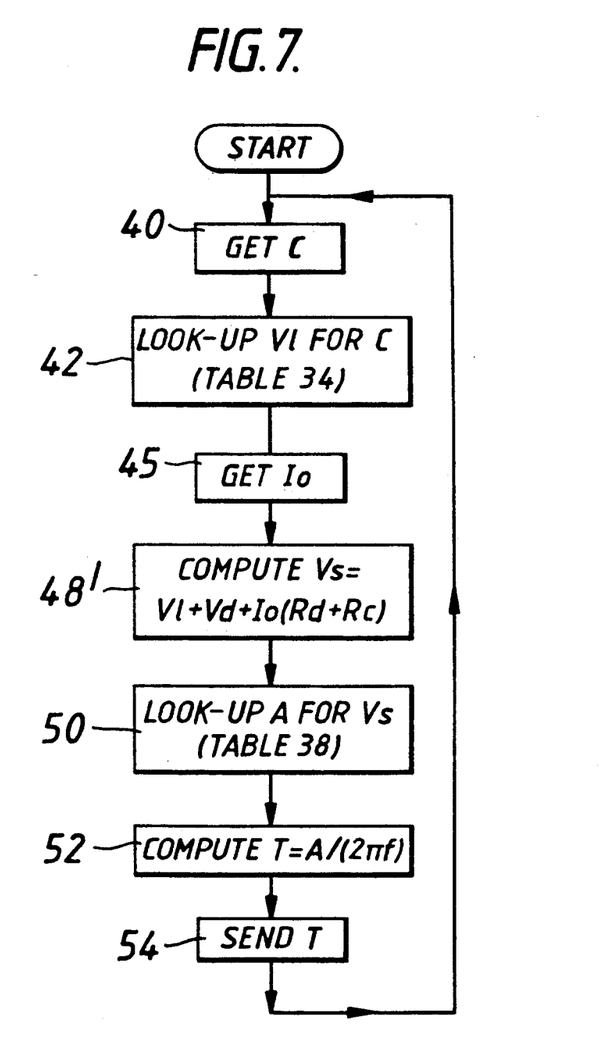
FIG. 7 is a flow chart of the processes carried out by the dimmer processor of FIG. 6.

It is possible that, in some applications, the errors in compensation described above could be minimized and tolerated. In this case, a simplified system can be used, in which the dimmer processor is modified as shown in FIG. 6 and performs a single process as shown in FIG. 7, rather than the two processes shown in FIGS. 4A and 4B. The dimmer processor of FIG. 6 is similar to that of FIG. 3, with the exception that there is no Table 36 relating RMS load voltage Vl to predicted current Ip', and there is no storage of a variable W. The process of FIG. 7 is similar to that of FIG. 4A, with the exception that steps 44 and 46 are replaced by the single step 45 of taking the measured load current Io from the I/O port 28, and step 48 is modified as shown in step 48' to compute the voltage drop across the dimmer and cable resistances Rd, Rc directly from the measured load current Io, so that the desired switched output RMS voltage Vs is determined from the equation:

$$Vs = Vl + Vd + Io(Rd + Rc)$$

It will be appreciated that, in order to permit the system to compensate for voltage drops and be able to supply the rated voltage, say 240V, to the loads, the input supply voltage must be greater than the rated voltage. This is achieved by supplying power through an autotransformer which steps up the supply voltage from, for example, nominally 240V to 264V, or by using a special high voltage mains supply of, for example, 264V.

The controlling operations of the dimmer system have been described above, but it will be appreciated that the system must firstly be initialized to set up the common Tables 36, 38, the common variable f, the table 34 for each dimmer, and the variables Rc, Rd, Vd for each dimmer, and the initial load value W for each dimmer. The tables 34 to 38 may be stored in non-volatile memory associated with each dimmer processor 18. Alternatively, they may be stored in non-volatile memory associated with the common processor 12 and be down-loaded to the dimmer processors in an initialization process. In this case, the dimmer transfer function Table 34 to be used for each dimmer may be selected, using the terminal 14, from any of a set of different tables providing, for example, a square-law transfer function, a linear function, a constant function, or a specially programmed function. The mains frequency value f may be measured by the dimmer processor 18 or by a mains processor 88 (FIG. 1) connected across the mains supply L-N and supplying the frequency value f to the I/O ports 28 of the dimmer processors either merely during the initialization process, or repetitively during the operation of the system. The values Rc, Rd, Vd and W for each channel may be entered by the terminal once the system is commissioned and stored in non-volatile memory associated with the common processor 12, and then be down-loaded to the dimmer processors 18 each time the system is initialized. Alternatively, these values may be sent to the dimmer processors when the system is commissioned and stored in non-volatile memory associated with the dimmer processors.

Figure 8:
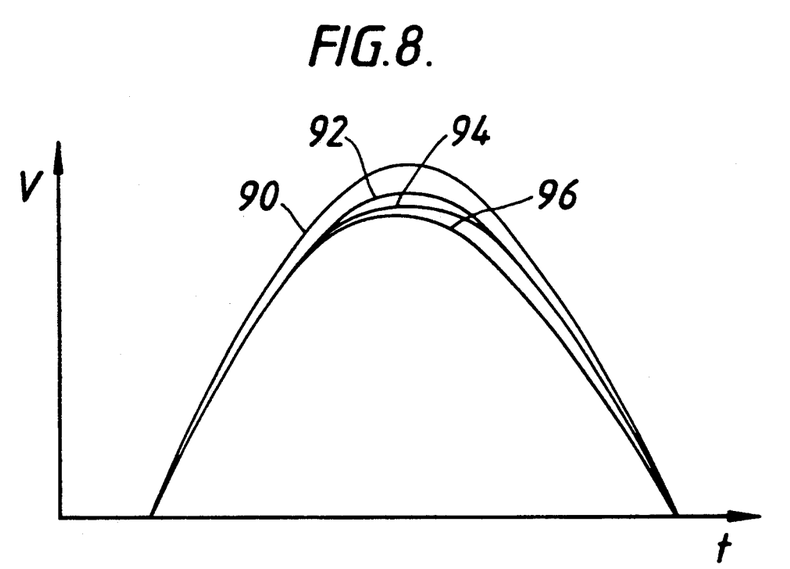
FIG. 8 is a voltage-time graph of a mains half-cycle.
Figure 9:
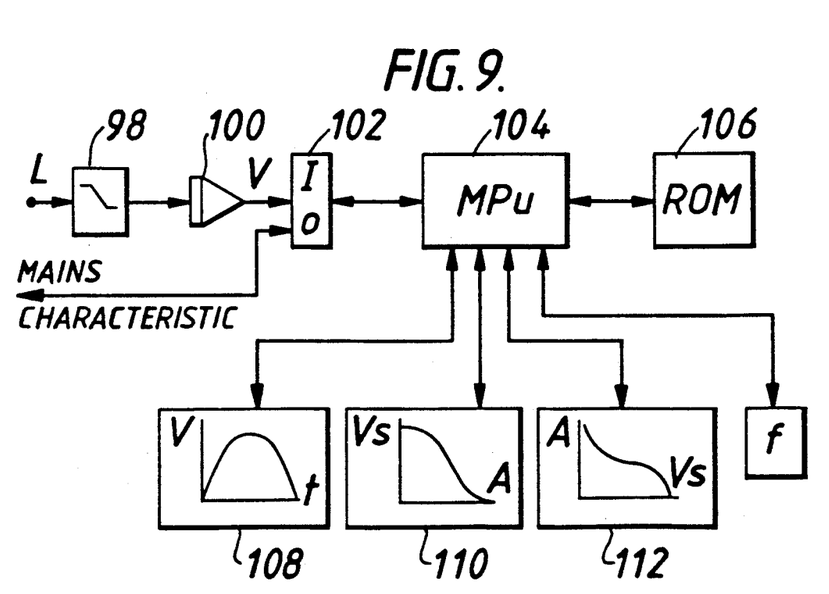
FIG. 9 is a block diagram of the mains compensation processor of FIG. 1.

In the system described above, it has been assumed that the Table 38 relating desired switched output RMS voltage Vs to required firing angle A is an invariable table. In one modification, in order to compensate for variations in the mains RMS voltage, the voltage Vs used as the address for Table 38 may be scaled by a factor of Vr/Vm, where Vr is the rated mains RMS voltage and Vm is a measured value of the actual mains RMS voltage. Whilst this may be satisfactory for some applications, it will be appreciated that other perturbations in the mains supply will cause variations in the required firing angle A to produce a desired switched output RMS voltage Vs. Referring to FIG. 8, a nominal mains half wave cycle is denoted by reference numeral 90 and is of perfect sine form, having a peak value which is root-two times the rated RMS voltage. In practice, however, various errors arise in the mains wave form. Firstly, the voltage may be generally low as shown by curve 92, or even high. Secondly, the peak of the wave may be suppressed due to saturation effects in the transformers of the supply network, as denoted by curve 94. Furthermore, in a theater, or a television or film studio, where a large number of dimmer-controlled loads are in use, a progressively larger load may be imposed on the mains as the mains half-cycle progresses, thus pulling down the supply voltage as the half-cycle progresses, as shown by curve 96. These various perturbations in the mains supply all effect the switched output RMS voltage Vs which is, in fact, obtained for a given firing angle A. The mains processor 88 (FIG. 1) is included to compensate for these perturbations by supplying to the dimmer processors 18 data for the Tables 38 (FIG. 3) derived from measurement and processing of the mains wave form, rather than including in the Tables 38 fixed theoretical data for a perfect form and amplitude of mains supply wave. Referring to FIG. 9, the mains processor 88 includes an input from the mains L which is applied, through a low-pass analog filter 98, which removes any high frequency interference on the signal, to an analog to digital converter 100, which applies a digital voltage signal V to an input/output port 102 for a processor 104. The processor 104 has associated ROM 106 and RAM including storage for three tables 108, 110, 112 and for a variable f.

Figure 10:
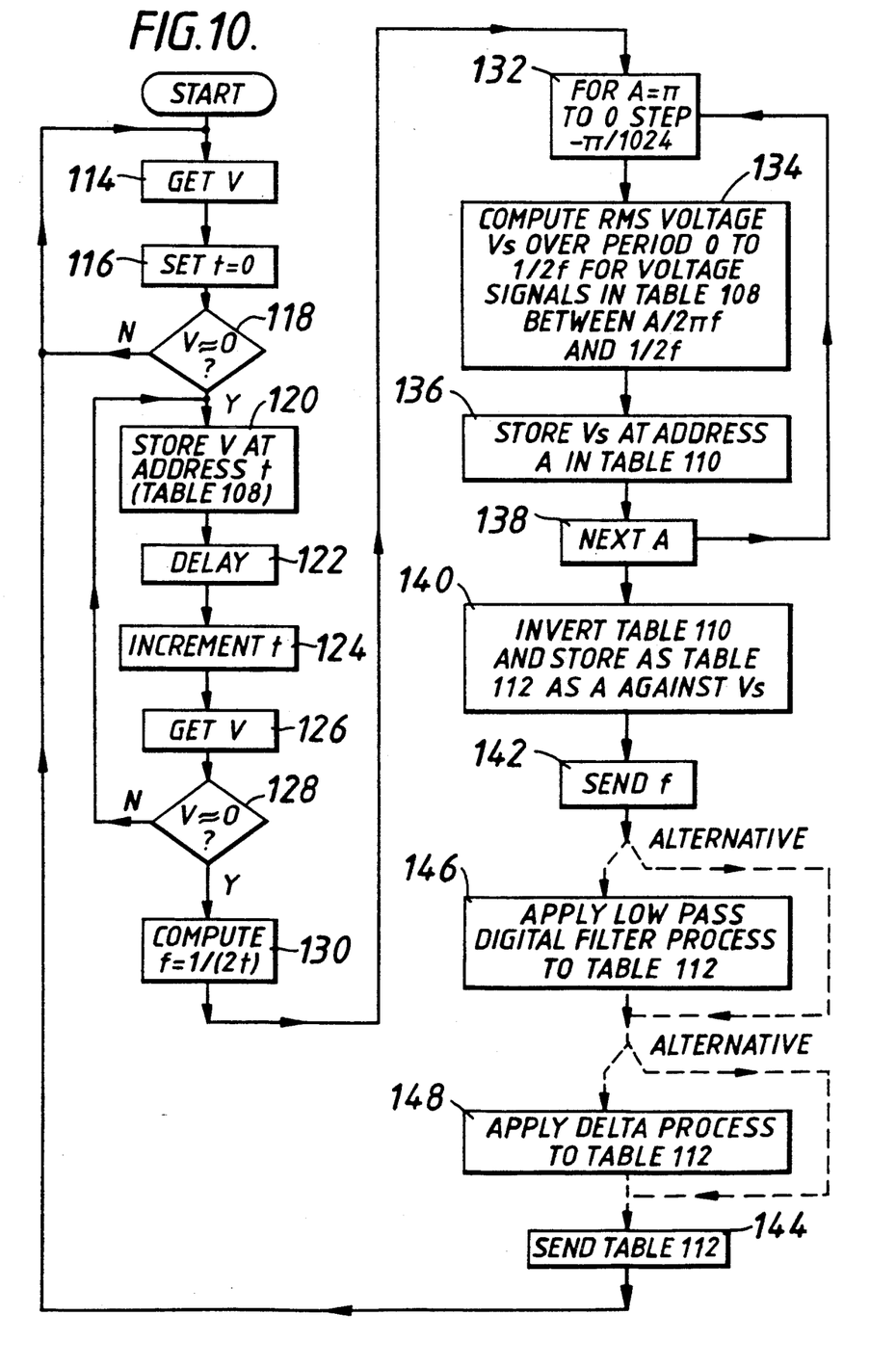
FIG. 10 is a flow chart of the process carried out by the mains compensation processor of FIG. 9.

The process carried out by the processor 104 is illustrated in FIG. 10. In steps 114 to 118, a variable t is reset and the voltage value V is repeatedly tested in a loop until a zero-crossing is detected in which the value v is substantially equal to zero. Then, the value of V is stored at an address corresponding to the time variable t in Table 108, in step 120. After a predetermined delay in step 122, the time variable for t is incremented in step 124. Then, in step 126, a fresh value for the voltage variable V is detected, and in step 128 it is tested whether the value V is substantially equal to zero indicating the end of a half-cycle period. If it is not, then the process loops back to step 120, where the value of the variable V is stored in Table 108 at an address t corresponding to the incremented time variable. It will therefore be appreciated that while the loop of steps 120 to 128 is running the Table 108 is built up of the instantaneous voltage of the mains over one half-cycle period. At the end of the half-cycle period, in step 130, the mains frequency f is computed from the equation f=1/(2t) and is stored in the RAM. Then, in steps 132 to 138, a loop process is performed for each value of firing angle variable A from pi to zero, with a step of −pi/1024. In this loop, in step 134, the RMS voltage Vs over the half-cycle period is computed for the voltage signals in Table 108 between the time A/(2.pi.f) and the time at the end of the half-cycle period, that is 1/(2f). In step 136, the computed RMS voltage signal Vs is stored in the Table 110 at an address corresponding to the firing angle A. It will therefore be appreciated that once the Table 110 has been completed, it stores the switched output RMS voltage which will be obtained for any of 1024 firing angles A over the half-cycle period. In step 140, the processor 104 performs an operation to invert the Table 110 and store it as Table 122, in which required firing angle A can be looked up for any required switched output RMS voltage Vs. In step 142, the variable f is sent to the I/O port 102 for transmission to the dimmer processors 18, and in step 144, the look-up table 112 is sent to the I/O port 102 for transmission to the dimmer processors and storage as Table 38 in each of the dimmer processors (see FIG. 3). Thus, each of the dimmer processors 18 has stored a look-up table of firing angle A against switched output RMS voltage Vs which has been derived by measuring the mains wave form, rather than a theoretical look-up table.

Since the transmission of the Table 112 will entail heavy data traffic, either one of two modifications may be made to the process shown in FIG. 10. In one modification, after step 142, a low-pass digital filter process is applied to the data in Table 112 prior to transmission in order to reduce the amount of data. Then, when the Tables 38 are set up in the dimmer processors 18, an interpolation operation can be carried out to obtain values of firing angle A for voltages Vs intermediate the values which have been transmitted.

In the second modification, in step 148, a delta process is applied to the data in Table 112, so that rather than transmitting the absolute firing angle value A for each voltage Vs, the difference between that firing angle value A and the previous firing angle value A is transmitted. Therefore, less bits of data will be required to be sent.

Referring to FIG. 1, a single mains processor 88 has been shown for all of the dimmer processors. In a modification to this arrangement, in order to avoid the heavy amount of data traffic from the mains processor 88, the mains processing may be carried out by each dimmer processor 18 so that the Table 112 produced in the mains processing also serves as the Table 38 for the dimmer processing.

It will be appreciated that in the case where a theater or studio is supplied with a three-phase mains supply, then there will be differences between the mains wave form on each of the three phases. In order to account for this difference, three mains processes may be carried out, one for each phase, and the dimmer processors may refer to the appropriate look-up table in dependence upon which phase is being used to power the lighting load in question.

Whilst the embodiment of the invention described above utilizes power control by thyristors which are gated on and remain on for the remainder of the half-cycle, it will be appreciated that the invention is also applicable in the case where gate turn-off thyristors are used, or in the case where pulse-width-modulated switching devices are employed. The invention may also be put into practice using a variable resistor or transformer for varying the power supplied to the load.

Reference is directed to U.S. patent application Ser. No. 449,585 filed concurrently herewith, the matter of which is incorporated herein by reference.

We claim:

1. A method of controlling power supplied from an AC supply to a lighting load by a circuit including a controllable switch, the method comprising the steps of:
    measuring the supply voltage a multiplicity of times over a half-wave cycle of the supply;
    producing from the measured voltages a table indicating how the switch should be operated to obtain any of a multiplicity of RMS output voltages; receiving a signal indicative of a desired RMS output voltage;
    determining from the table the switch operation required for the desired RMS output voltage; and
    operating the controllable switch in the determined manner.

2. A controller for an electric lighting load, comprising:
    a controllable switch for connecting an AC power supply to a lighting load; and
    means for controlling the switch to conduct during a halfwave cycle of the AC supply for a conduction period less than or equal to the half-cycle supply period to produce a desired switched output RMS voltage, the controlling means comprising:
    means to measure the AC supply voltage at a multiplicity of sampling times over a half-cycle period;
    means to calculate from the measured voltages for each of a plurality of sampling times the RMS voltage which would be obtained by causing the switch to operate in accordance with that sampling time;
    means to receive a signal indicative of the desired switched output RMS voltage;
    means to determine the sampling time for which the calculated RMS voltage corresponds to the desired RMS voltage; and
    means for operating the switch in accordance with the determined time in a half-cycle period.

3. A controller as claimed in claim 2, further comprising a low pass filter for filtering the measured AC supply voltage to remove high frequency interference therefrom.

4. A controller as claimed in claim 2, wherein the measuring means includes an analog-to-digital converter, the digital voltage values being stored in a memory.

5. A controller as claimed in claim 4, wherein the calculating means is operable to calculate for each of the sampling times a value representing the sum of the squares of the voltage values for each of the sampling times from that sampling time to the end of the half-cycle, and to store the calculated values as a table in a memory with addresses corresponding to the sampling times.

6. A controller as claimed in claim 5, further comprising means for forming in a memory an inverse of said table having values corresponding to the sampling times stored at addresses corresponding to RMS voltage values, the determining means being operable to address the inverse table memory according to the desired RMS voltage to determine the triggering time therefrom.

7. A controller as claimed in claim 5, further comprising means to transmit the table data to a further memory.

8. A controller for an electric lighting load, comprising:
    a controllable switch for connecting an AC power supply to alighting load: and
    means for controlling the switch to conduct during a halfwave cycle of the AC supply for a conduction period less than or equal to the half-cycle supply period to produce a desired switched output RMS voltage, the controlling means comprising:
    means to measure the AC supply voltage at a multiplicity of sampling items over a half-cycle period, said means including an analog-to-digital converter, the digital voltage values being stored in a memory;
    means to calculate from the measured voltages for each of a plurality of sampling times the RMS voltage which would be obtained by causing the switch to operate in accordance with that sampling time, said means being operable to calculate for each of the sampling times a value representing the sum of the squares of the voltage values for each of the sampling times from that sampling time to the end of the half-cycle, and to store the calculated values as a table in a memory with addresses corresponding to the sampling times;
    means to receive a signal indicative of the desired switched output RMS voltage;
    means to determine the sampling time for which the calculated RMS voltage corresponds to the desired RMS voltage;
    means for operating the switch in accordance with the determined time in a half-cycle period;
    a low pass filter for filtering the measured AC supply voltage to remove high frequency interference therefrom;
    means for forming in a memory an inverse of said table having values corresponding to the sampling times stored at addresses corresponding to RMS voltage values, the determining means being operable to address the inverse table memory according to the desired RMS voltage to determine the triggering times therefrom;
    means to transmit the table data to a further memory; and
    means for digitally filtering the data to produce a lesser number of data items for transmission, and means to re-construct the table of data in the further memory by interpolation.

9. A controller as claimed in claim 8, further comprising means for differentially processing the data items for transmission.

* * * * *